Oct. 1, 1929.  N. L. FURJANICK  1,729,936
NONGLARE SHIELD
Filed Oct. 5, 1928  2 Sheets-Sheet 1
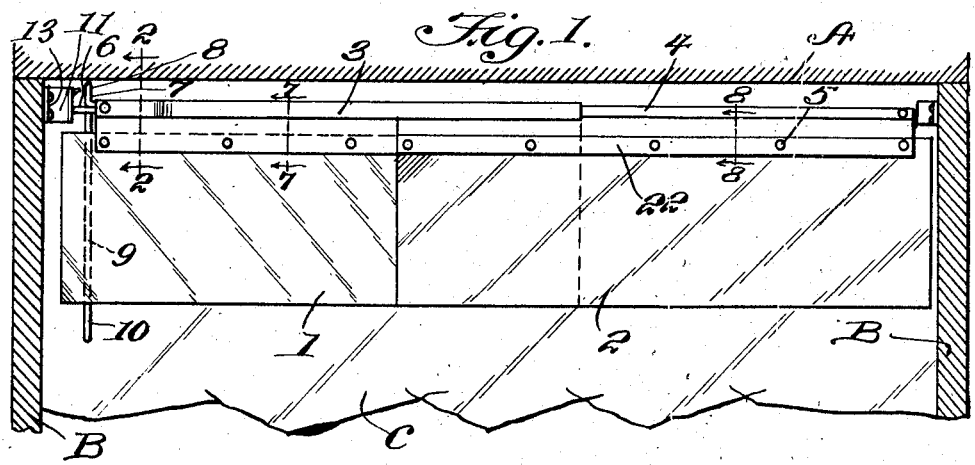
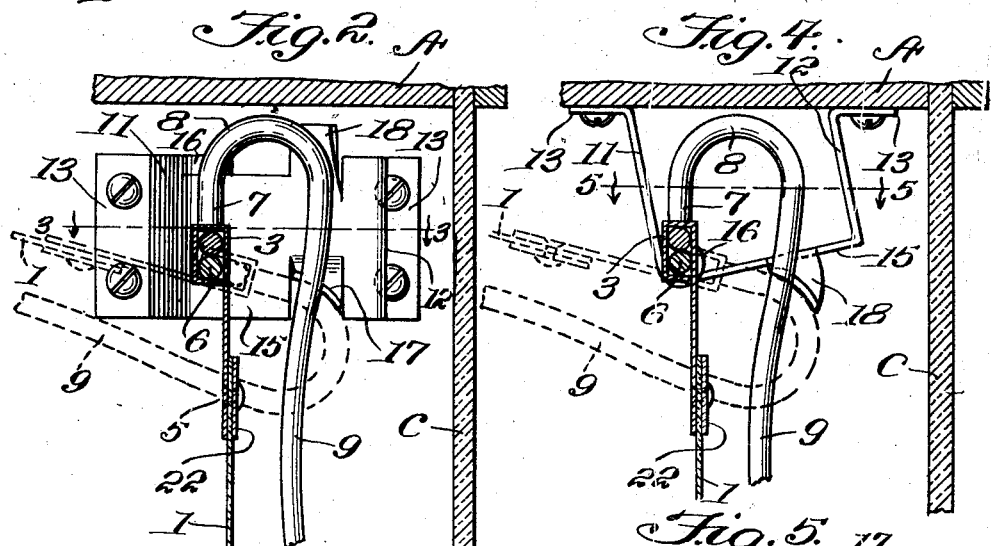
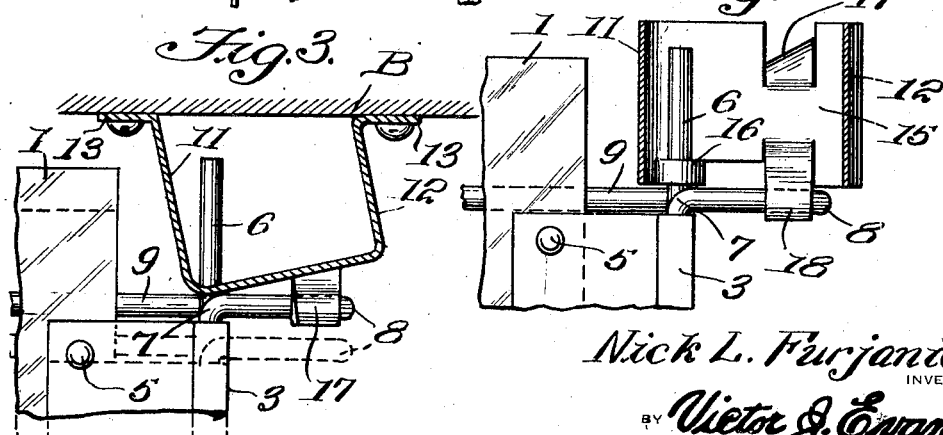
Nick L. Furjanick
INVENTOR
BY Victor J. Evans
ATTORNEY
WITNESS:

Oct. 1, 1929. N. L. FURJANICK 1,729,936
NONGLARE SHIELD
Filed Oct. 5, 1928 2 Sheets-Sheet 2
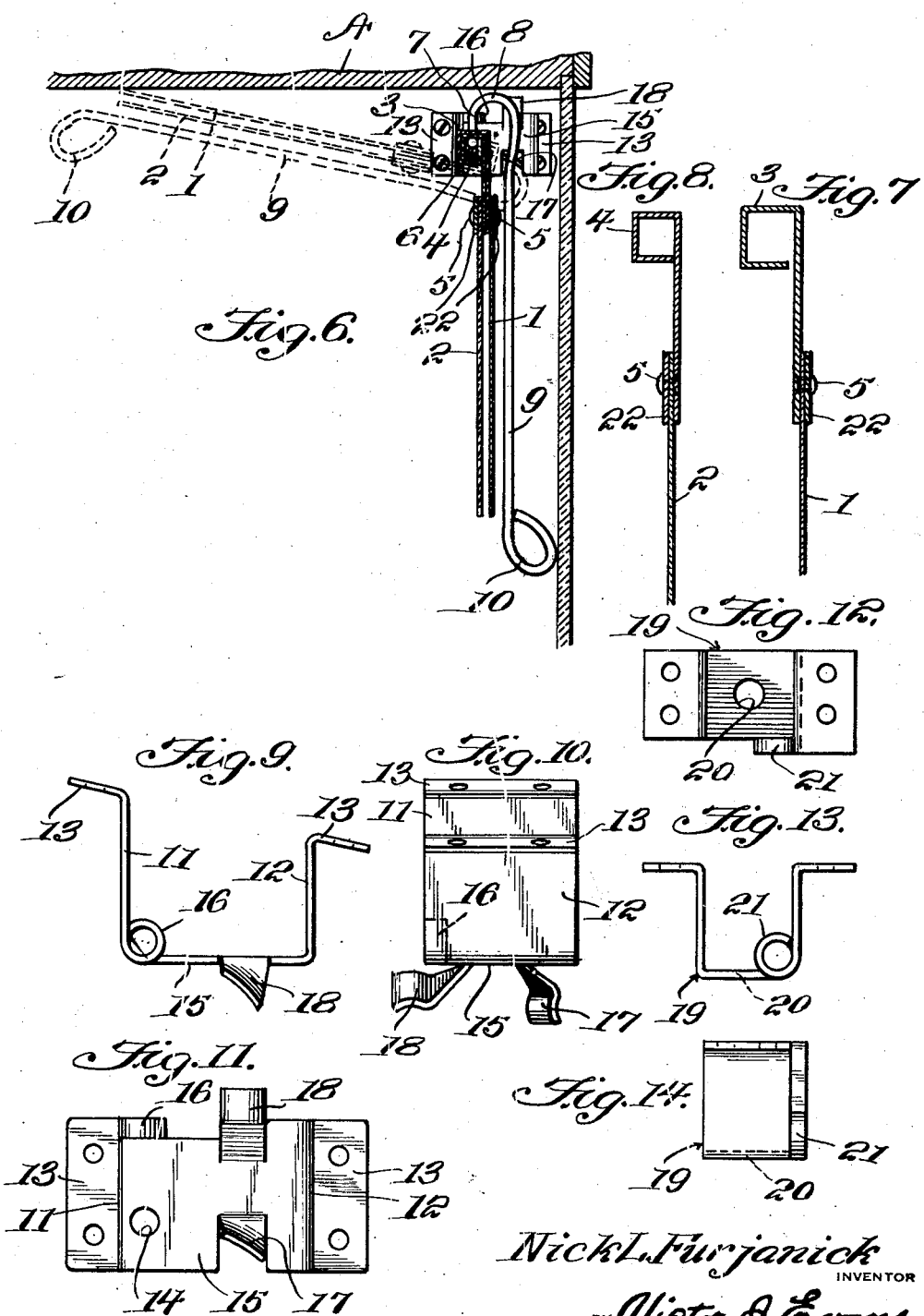
Nick L. Furjanick
INVENTOR
BY Victor J. Evans
ATTORNEY
WITNESS: J. T. L. Wright Patented Oct. 1, 1929

1,729,936

UNITED STATES PATENT OFFICE

NICK L. FURJANICK, OF VIRGINIA, MINNESOTA

NONGLARE SHIELD

Application filed October 5, 1928. Serial No. 310,554.

This invention relates to non-glare shields for vehicles, and its general object is to provide a non-glare shield that is adjustable to fit across the entire length of various sizes of vehicle windshields and is capable of being secured for movement to the sides of a vehicle body as well as to the inner side of the top, with the result, it can be associated with many types and sizes of vehicles in an easy and expeditious manner with very little effort.

A further object of the invention is to provide a non-glare shield for motor vehicles, that includes means for retaining the same in raised position regardless of its place of application to the vehicle.

Another object of the invention is to provide a non-glare shield of the character set forth, that is simple in construction, inexpensive to manufacture, and efficient in operation and service.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a sectional view taken through the vehicle body and illustrating the application of the shield forming the subject matter of the present invention to the sides thereof.

Figure 2 is a sectional view taken approximately on line 2—2 of Figure 1, looking in the direction of the arrows.

Figure 3 is a sectional view taken approximately on line 3—3 of Figure 2 with the parts arranged as shown in dotted lines.

Figure 4 is a view similar to Figure 2 showing the application of the shield to the top of the body.

Figure 5 is a sectional view taken approximately on line 5—5 of Figure 4, looking in the direction of the arrows with the parts arranged as shown in dotted lines.

Figure 6 is an edge elevation of the shield in applied position and showing the same in operative position in full lines and raised position in dotted lines.

Figure 7 is a sectional view taken approximately on line 7—7 of Figure 1, looking in the direction of the arrows.

Figure 8 is a sectional view taken approximately on line 8—8 of Figure 1 looking in the direction of the arrows.

Figure 9 is an edge view of the handle supporting bracket for the shield.

Figure 10 is a perspective view thereof.

Figure 11 is a bottom plan view of Figure 9.

Figure 12 shows the other bracket in elevation.

Figure 13 is an edge view thereof.

Figure 14 is a view taken at right angles to Figure 13.

Referring to the drawings in detail, the letter A indicates the top of a motor vehicle body, B the sides and C the windshield.

The glare shield includes in its construction two elongated sheets of semi-transparent material, indicated respectively by the reference numerals 1 and 2. These sheets may be of any desired color without departing from the spirit of the invention and have their upper ends secured to the depending portions of telescopically mounted housings 3 and 4 through the medium of rivets 5 or other like securing means as best shown in Figure 1 of the drawings. By this construction, it will be apparent that the sheets can be adjusted with respect to each other so as to provide a shield to fit across the entire width of a windshield.

Arranged in the housings 3 and 4 is a shaft 6 which has its ends journaled in bearing brackets which may be secured to the top A or the sides B, it depending of course upon the desires of the user and the type of vehicle to which the glare shield is to be applied. Secured in the housing 3 and having its secured portion arranged in parallelism with the shaft 6 is a handle 7 which is bent at right angles at its juncture with its secured portion, thence is curved upon itself as at 8 to provide a portion 9 arranged substantially in parallelism with the sheets. The portion 9 has its lower end terminating in a loop 10 to provide a hand hold as will be apparent.

One of the bearing brackets for the shaft 6 is substantially larger than the other bearing bracket, and as best shown in Figures 9 to 11 inclusive include arms 11 and 12 of different lengths. These arms 11 and 12 are formed with apertured ears 13 arranged at right angles thereto and for the purpose of receiving a suitable securing means such as screws, whereby this bracket can be secured to the top or side of the vehicle body as shown in Figures 2 and 4, and when the bracket is secured to the sides, the shaft is mounted for rotation in an opening 14 formed in the bight portion 15, but when the bracket is secured to the top, the shaft is received in an eye 16 arranged at the juncture of the arm 11 with the bight portion as best shown in Figure 9. The bight portion has formed therewith tongues indicated respectively by the reference numerals 17 and 18, and these tongues are disposed to receive the handle for supporting the shield in its raised position. The tongue 17 is adapted for this purpose when the bracket is secured to the side of the vehicle while the tongue 18 is used when the bracket is secured to the top of the vehicle.

Cooperating with the bracket which includes the tongues 17 and 18, is a bracket 19 for receiving the opposite end of the shaft, and the bracket 19 is provided with an opening 20 and an eye 21 for receiving the shaft which is not only mounted for rotation in either the openings or the eyes, but is free to move longitudinally therein so that the handle can be moved into and out of engagement with the tongues 17 and 18 when it is desired to raise or lower the shield.

A reinforcing strip 22 is provided at the upper edge of the sheets for receiving the rivets 5, and if desired, bracing strips for the sheets may be provided and in this event the strips will be disposed transversely of the sheets and have one of their ends secured to the housings while the opposite ends are secured adjacent to the outer edges of said sheets. A guide member may likewise be provided for said sheets to prevent them from buckling or being unduly spaced apart in the event isinglass, celluloid or like flexible material is used.

From the above description and disclosure of the drawings, it will be obvious that I have provided a non-glare shield that includes adjustably mounted translucent sheets whereby they can be disposed across the entire width of a vehicle windshield, and the shield can be secured to the top or the sides of the body in a manner as set forth.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

A non-glare shield for motor vehicles comprising brackets having openings therein, eyes formed with said brackets, a shaft mounted in said brackets for rotation and being adapted to be received in the openings when said brackets are secured to the sides of a vehicle body and in the eyes when the brackets are secured to the top of said body, telescopically mounted means secured to said shaft, depending portions included in said telescopically mounted means, an elongated sheet of colored semi-transparent material secured to the depending portions and arranged in overlapped association, a handle secured to said telescopically mounted means and being curved upon itself, and tongues formed with one of said brackets and being arranged to receive the curved portion of said handle for supporting the glare shield in raised position.

In testimony whereof I affix my signature.

NICK L. FURJANICK.